(12) United States Patent
Kamiya et al.

(10) Patent No.: US 7,468,704 B2
(45) Date of Patent: *__Dec. 23, 2008__

(54) MOLDED COMPONENT FOR BEAM PATH OF RADAR APPARATUS

(75) Inventors: Itsuo Kamiya, Toyota (JP); Izumi Takahashi, Toyota (JP); Hideo Kamiya, Nagoya (JP); Koichi Tanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 244 days.

This patent is subject to a terminal disclaimer.

(21) Appl. No.: 11/042,113

(22) Filed: Jan. 26, 2005

(65) Prior Publication Data

US 2005/0168374 A1    Aug. 4, 2005

(30) Foreign Application Priority Data

Feb. 2, 2004    (JP)    ............................. 2004-025793

(51) Int. Cl.
*H01Q 1/42*    (2006.01)
*H01Q 1/32*    (2006.01)

(52) U.S. Cl. ...................................... 343/713; 343/872

(58) Field of Classification Search ............... 342/1, 342/4, 198; 438/66; 428/200–220; 343/713
See application file for complete search history.

(56) References Cited

U.S. PATENT DOCUMENTS

| | | | |
|---|---|---|---|
| 3,154,432 A * | 10/1964 | Herrick | 428/412 |
| 3,255,035 A * | 6/1966 | Clough et al. | 427/251 |
| 3,396,400 A | 8/1968 | Kelly et al. | |
| 4,241,129 A * | 12/1980 | Marton et al. | 428/216 |
| 4,419,570 A * | 12/1983 | Kalbskopf et al. | 219/522 |
| 4,837,135 A * | 6/1989 | Milner | 430/524 |
| 5,877,727 A * | 3/1999 | Saitou et al. | 343/713 |
| 5,911,899 A * | 6/1999 | Yoshikai et al. | 219/522 |
| 5,964,113 A * | 10/1999 | Wake et al. | 72/46 |
| 6,184,842 B1 * | 2/2001 | Leinweber et al. | 343/872 |
| 6,328,358 B1 * | 12/2001 | Berweiler | 293/115 |
| 6,413,630 B1 * | 7/2002 | Nakayama | 428/344 |
| 6,433,753 B1 * | 8/2002 | Zimmermann | 343/872 |
| 6,465,102 B1 * | 10/2002 | Honigfort et al. | 428/412 |
| 6,500,910 B1 * | 12/2002 | Koike et al. | 526/247 |
| 6,504,501 B2 * | 1/2003 | Tsuno et al. | 342/1 |
| 6,620,493 B2 * | 9/2003 | Hasegawa et al. | 428/220 |
| 6,663,957 B1 * | 12/2003 | Takushima et al. | 428/355 R |
| 6,726,964 B1 * | 4/2004 | Thompson et al. | 427/600 |
| 6,777,610 B2 * | 8/2004 | Yamada et al. | 136/251 |

(Continued)

FOREIGN PATENT DOCUMENTS

JP    A-08-103982    4/1996

(Continued)

*Primary Examiner*—Thomas H Tarcza
*Assistant Examiner*—Matthew M Barker
(74) *Attorney, Agent, or Firm*—Oliff & Berridge, PLC (57) ABSTRACT

A molded component for the beam path of a radar apparatus with low radio transmission loss and improved hardness and abrasion resistance is provided. The molded component for the beam path of the radar apparatus comprises a base body 1 composed of a resin layer, and a bright decoration layer 2 disposed on the surface of the base body, the bright decoration layer being composed of tin and/or a tin alloy.

7 Claims, 5 Drawing Sheets

U.S. PATENT DOCUMENTS

| | | | |
|---|---|---|---|
| 6,803,540 B2 * | 10/2004 | Yamada et al. | 219/121.85 |
| 6,811,850 B1 * | 11/2004 | Hirata | 428/64.2 |
| 6,875,484 B1 * | 4/2005 | Kogure et al. | 428/34.1 |
| 6,930,140 B2 * | 8/2005 | Amou et al. | 524/475 |
| 2001/0037935 A1 * | 11/2001 | Oya et al. | 200/512 |
| 2002/0171579 A1 | 11/2002 | Artis et al. | |
| 2003/0039839 A1 * | 2/2003 | Haruta et al. | 428/421 |
| 2003/0152756 A1 * | 8/2003 | Yamada et al. | 428/210 |
| 2003/0170410 A1 * | 9/2003 | Buch-Rasmussen et al. | 428/35.7 |
| 2004/0174596 A1 * | 9/2004 | Umeki | 359/484 |
| 2004/0200818 A1 * | 10/2004 | Yamada et al. | 219/121.85 |
| 2005/0020781 A1 * | 1/2005 | Sugimasa et al. | 525/333.7 |
| 2005/0168374 A1 * | 8/2005 | Kamiya et al. | 342/1 |
| 2005/0237261 A1 * | 10/2005 | Fujii et al. | 343/872 |
| 2006/0172100 A1 * | 8/2006 | Hu et al. | 428/35.8 |
| 2006/0216442 A1 * | 9/2006 | Kamiya et al. | 428/31 |
| 2006/0234002 A1 * | 10/2006 | Nee | 428/64.4 |

FOREIGN PATENT DOCUMENTS

| | | |
|---|---|---|
| JP | A-10-193549 | 7/1998 |
| JP | A-2000-049522 | 2/2000 |
| JP | A-2000-159039 | 6/2000 |
| JP | A-2000-344032 | 12/2000 |
| JP | A-2002-135030 | 5/2002 |
| JP | A-2003-252137 | 9/2003 |

* cited by examiner

MOLDED COMPONENT FOR BEAM PATH OF RADAR APPARATUS

BACKGROUND OF THE INVENTION

1. Field of the Invention

The present invention relates to a molded component for protecting a radar apparatus, especially to a molded component for the beam path of a radar apparatus disposed behind the front grill of an automobile.

2. Background Art

In general, antennas that transmit and receive radio waves in communication devices, radar devices, and the like have rarely been restricted in terms of the design of their bodies and peripheral structures, since their functions have been given priority. For example, a rod antenna whose shape is exposed is used for automobile radio antennas and the like. There may be a case where the antenna is hopefully hidden depending on the location in which the antenna is attached. For example, in a radar system or the like that measures obstacles in front of an automobile and the distance between automobiles, the antenna is preferably disposed in a central position at the front of the automobile in order to make the most of its performance. In this case, although the antenna is likely to be installed near the front grill of automobile, it is preferable that it not be possible to view the antenna from the outside in terms of design.

An auto cruise system involves technology for controlling the distance between vehicles by accelerating or decelerating one's own vehicle, in which a sensor mounted in the front of the vehicle measures the distance and a relative speed between a vehicle in front and one's own vehicle, and the throttle and brakes are controlled based on this information. The auto cruise system has recently attracted attention as one of the core technologies of the intelligent transportation system (ITS) for easing traffic congestion and decreasing traffic accidents. In general, a radio transmitter-receiver device such as a millimeter-wave radar is used as a sensor for the auto cruise system.

Figure 6:
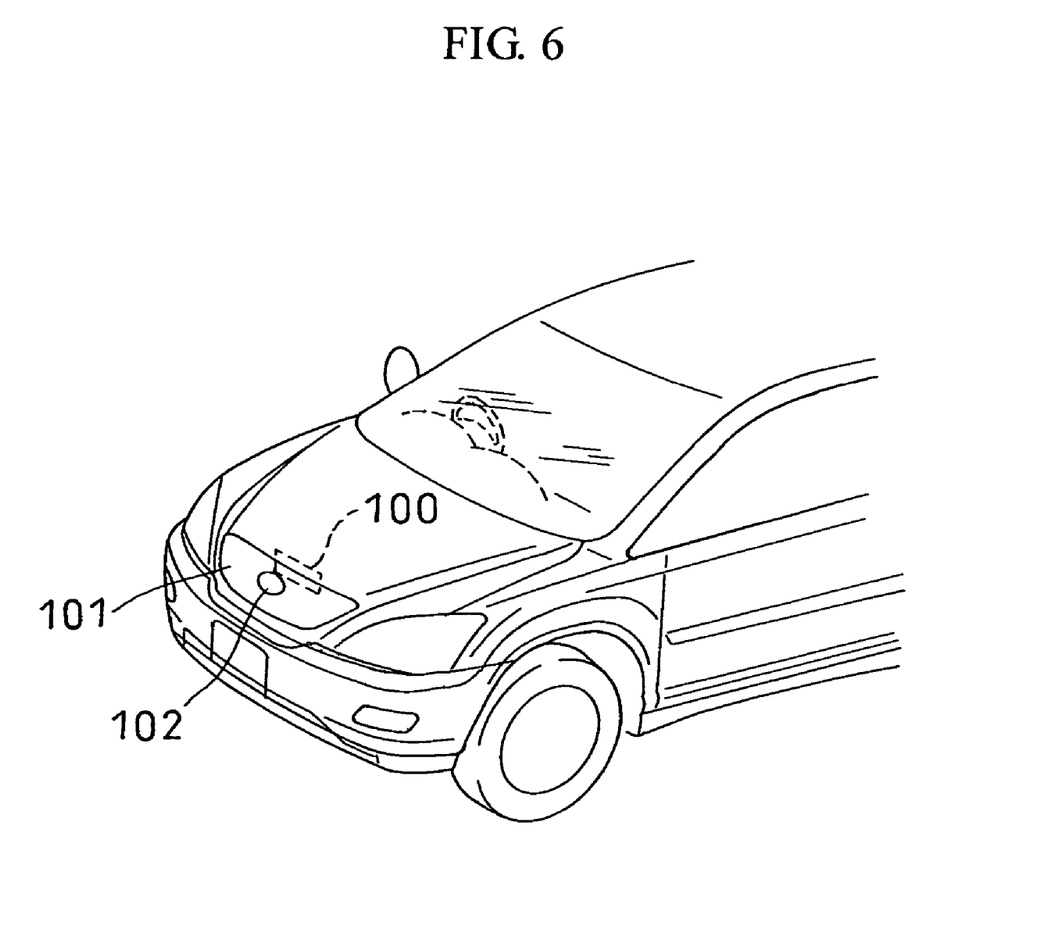
FIG. 6 shows a conceptual diagram of an automobile on which a radar apparatus is disposed.

As shown in FIG. 6, a radar apparatus 100 mounted in an automobile is usually disposed behind a front grill 101. An emblem 102 of an automobile manufacturer or a specific decoration is disposed on the front grill 101. Millimeter waves from the radar apparatus are radiated forward via the front grill and the emblem, and reflections from an object return to the radar apparatus via the front grill and the emblem.

Therefore, it is preferable to use materials and paints that provide low radio transmission loss and a predetermined appearance for the front grill and the emblem, especially where the beam path of a radar apparatus is arrayed.

In this manner, a radio transmitter-receiver device is generally disposed behind the back surface of the front grill of a vehicle. However, there are many cases where the front grill is metal plated, so that it is difficult to transmit radio waves satisfactorily through the highly conductive metal. Also, front grills have a structure where air holes for taking in air are disposed, and front grills do not have uniform thicknesses. Therefore, when radio waves pass in and out through such a front grill, there is a difference in a radio transmission speed between the thin portion and the thick portion of the front grill, so that it is difficult to obtain good radar sensitivity.

On account of these reasons, in general, a window portion that is capable of transmitting radio waves is disposed in a portion of the front grill that corresponds to the portion where the radio transmitter-receiver device is disposed. When the window portion is disposed in the front grill, radio waves can pass in and out through the window portion. However, by including a window portion, the appearance of the front grill loses continuity and the appearance of the vehicle may be spoiled, since the internal portions of the vehicle, such as the radio transmitter-receiver device and the engine area, are viewed.

Therefore, conventionally, unity is provided between the window portion and the front grill body by inserting a radio transmission cover as disclosed in JP Patent Publication (Kokai) No. 2000-159039 A into the window portion of the front grill, for example. The radio transmission cover as disclosed in JP Patent Publication (Kokai) No. 2000-159039 A is formed by laminating a plurality of resin layers formed with concavity and convexity. This covering component can provide an impression by a metal layer deposited with concavity and convexity between the resin layers such that the fin member of the front grill continuously exists in the radio transmission cover.

Indium is used as a metal deposited in such a radio transmission cover. When depositing indium on a deposit member, indium is not deposited on the surface of the deposit member in a uniform film manner, but deposited in a minute insular manner. In other words, when indium is deposited on the deposit member, the surface of the deposit member has a minute mixture of a deposit portion where indium is deposited in a minute insular manner and a non-deposit portion where nothing is deposited. In this case, radio waves can pass in and out through the non-deposit portion and the surface of the deposit member can be recognized upon viewing as a member that has metallic luster, since the deposit portion has indium deposited in a minute insular manner.

However, as indium is an expensive metallic material, the increased material cost when the deposition is performed using indium is problematic. Moreover, it is difficult to form the deposited portion and the non-deposited portion in a well-balanced manner. For example, there is a case where radio waves do not pass in and out satisfactorily when the deposit portions are formed extremely closely together.

JP Patent Publication (Kokai) No. 2003-252137A discloses a method for manufacturing a radio transmission cover in order to enable processing of a metallic film using various metallic materials in addition to indium, and to provide a method for manufacturing a radio transmission cover in which radio waves pass in and out satisfactorily. The method comprises a first step for forming a cover base member in a planar table manner, a second step for forming the metallic film on one surface of the cover base member such that the shape of the metallic film corresponds to the shape of the aforementioned fin portion, a third step for forming a bright portion in an insular manner by physically or chemically removing a part of the metallic film, and a fourth step for forming a transparent resin layer on the upper layer of a plane where the bright portion of the cover base member is formed. The radio transmission cover is disposed on the front grill of a vehicle, the front grill having a reticular fin portion, and a radio transmitter-receiver device is disposed on the back surface side thereof.

JP Patent Publication (Kokai) No. 2000-159039 A and JP Patent Publication (Kokai) No. 2000-49522 A disclose a thin metallic layer comprising indium deposited on a metal portion area that can be viewed from the outside at a plastic-plated member for the beam path of a radar apparatus. However, it is necessary to ensure a bright design and the reliability of durability for radio transmittance by forming a stable protective layer so as not to allow the indium bright film layer to undergo exfoliation or be damaged by an external force, or to be corroded by an external environmental stress such as water or polluted air.

This is due to the following facts: indium is a very soft metallic material with a value of 1.2 in the Mohs hardness scale; indium corrodes under the aforementioned environmental stress since it is basically a metallic material; it is necessary to ensure the reliability of durability by securing the film thickness with certainty such that the bright-effect design of indium can be obtained without thickening the indium film layer more than is necessary since a radio transmission loss occurs as a conductivity loss based on the fact that indium is basically a metallic material; and the indium layer melts due to the heat of molten resin when successively conducting secondary formation of the lining resin on a resin-molded component in which a film is formed on the surface of a base body in advance, since the melting point of indium is 156° C., which is extremely low, for example.

JP Patent Publication (Kokai) No. 2000-344032 A discloses a ceramic film comprising silicon dioxide disposed as a protective layer for preventing exfoliation and ensuring anticorrosion of an indium film.

SUMMARY OF THE INVENTION

Although indium film is suitable for a film of an emblem or the like as it shows a metallic color, it poses problems in that it readily experiences exfoliation and lacks durability and abrasion resistance. Also, indium film may corrode, since it is basically a metal. Thus, when a ceramic film comprising silicon dioxide is disposed, the durability is improved and the film, or a paint, can be protected. However, the ceramic film comprising silicon dioxide is colorless, so that the appearance of a metallic color, for example, cannot be provided.

In view of the aforementioned problems in the prior art, it is an object of the present invention to provide a molded component that offers stable effects as a product over a long period of time, which is a molded component providing a low level of radio transmission loss for the beam path of a radar apparatus. It is also an object of the present invention to provide a molded component that shows a bright color for the beam path of a radar apparatus.

The inventors found that the aforementioned object could be achieved by using a specific metal for a bright decoration layer and arrived at the present invention.

The present invention is an invention of a molded component for the beam path of a radar apparatus. The molded component comprises a base body composed of a resin layer, and a bright decoration layer on the surface of the base body, the bright decoration layer being composed of tin and/or a tin alloy. By using the bright decoration layer composed of tin and/or a tin alloy, hardness and abrasion resistance can be improved as compared with the indium layer of the prior art. Also, radio transmittance can be improved as compared with the indium layer.

Preferably, the aforementioned tin and/or a tin alloy is tin (Sn) alone or an alloy of tin (Sn) and one or more elements selected from indium (In), gallium (Ga), antimony (Sb), and bismuth (Bi).

The bright decoration layer comprising the aforementioned tin and/or a tin alloy can include a plurality of layers. For example, the bright decoration layer comprising the aforementioned tin and/or a tin alloy can include an Sn-alone layer and an Sn-alloy layer.

Methods for forming the bright decoration layer comprising the aforementioned tin and/or a tin alloy are not limited. Specifically, methods include vacuum film forming methods such as a vacuum deposition method, an ion plating method, and a sputtering method, for example; vapor growth methods such as thermal CVD, plasma CVD, photo CVD, and MOCVD, for example; the LB (Langmuir-Blodgett) method, electroless deposition, the sol-gel method; and the like.

Preferably, each layer that forms the bright decoration layer comprising the aforementioned tin and/or tin alloy has a thickness of 1 nm to 500 nm. Further preferably, the thickness is 10 nm to 100 nm.

Preferably, the aforementioned base body is formed by a transparent resin that resulting in low radio transmission loss or a transparent resin resulting in low dielectric loss.

The molded component for the beam path of a radar apparatus according to the present invention can further include a non-transparent resin layer for enhancing the tone of color.

According to the present invention, a molded component for the beam path of a radar apparatus with low radio transmission loss and improved hardness and abrasion resistance can be provided.

DESCRIPTION OF THE PREFERRED EMBODIMENTS

Figure 1:
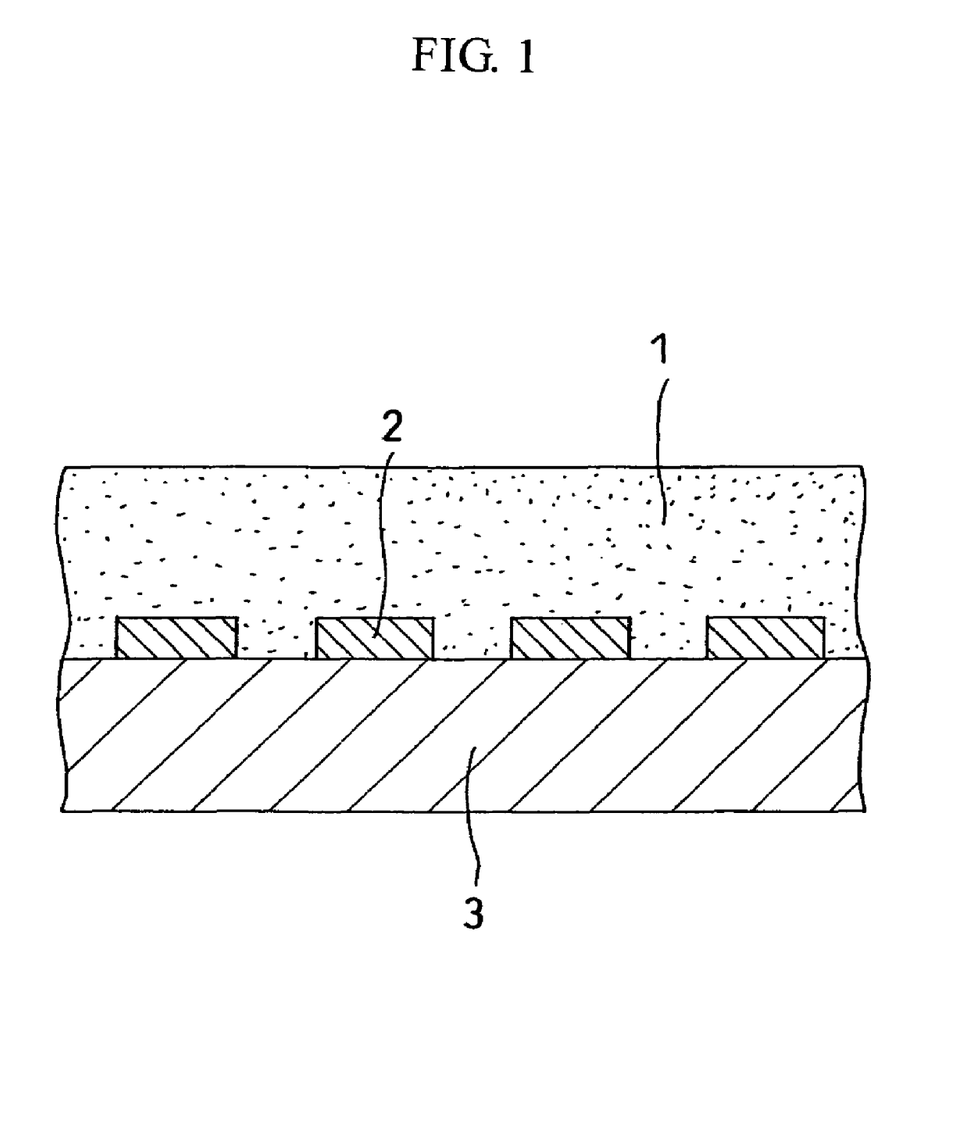
FIG. 1 shows a cross section of the surface area of the molded component for the beam path of a radar apparatus according to the present invention.

FIG. 1 shows an example of a cross section of the surface of the molded component for the beam path of a radar apparatus according to the present invention. On the surface of a base body 1 comprising a transparent resin layer, a bright decoration layer 2 comprising tin and/or a tin alloy is disposed using a deposition method, for example, and a non-transparent resin layer 3 for enhancing the tone of color is formed.

Figure 2:
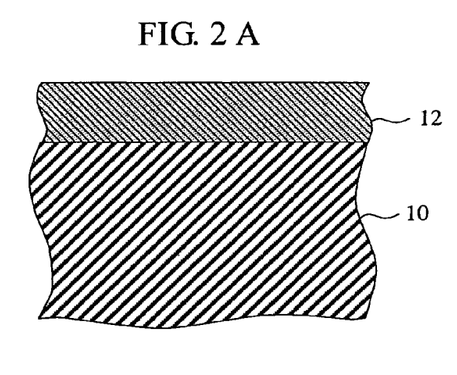
FIG. 2 shows another cross section of the surface area of the molded component for the beam path of a radar apparatus according to the present invention.

FIG. 2 shows another example of a cross section of the surface of the molded component for the beam path of a radar apparatus according to the present invention. FIG. 2A shows a second example of the present invention. The molded component of the example comprises a base body 10 and a bright decoration layer 12 disposed thereon, the bright decoration layer being composed of tin.

FIG. 2B shows a third example of the present invention. In the molded component of the example, the bright decoration layer has a multilayered structure. The molded component comprises a base body 10, a first bright decoration layer 12 composed of tin disposed thereon, and a second bright decoration layer 13 composed of tin and/or a tin alloy disposed thereon. By employing a multilayered structure for the bright decoration layer, an appearance that shows a metallic color and a rainbow-like interference color can be obtained.

FIG. 2C shows a fourth example of the present invention. The molded component of the example comprises a base body 10 and a bright decoration layer 14 composed of a tin alloy disposed thereon. FIG. 2D shows a fifth example of the present invention. The molded component of the example comprises a base body 10, a first bright decoration layer 14 composed of a tin alloy disposed thereon, and a second bright decoration layer 15 composed of tin disposed thereon.

The bright decoration layers 12 and 15 composed of tin, and bright decoration layers 13 and 14 composed of a tin alloy, may be formed by a vacuum deposition method. Preferably, each layer used to form the bright decoration layer has a thickness of 1 nm to 500 nm. Further preferably, the thickness is 10 nm to 100 nm.

A desired color can be expressed by suitably selecting the material types that constitute the bright decoration layers 12 and 15 composed of tin, and bright decoration layers 13 and 14 composed of a tin alloy, and by suitably selecting the thickness of the layers.

The base body 10 is composed of a material that is provides low radio transmission loss and is superior in terms of dielectric properties. Relative permittivity $\epsilon'$ and dielectric loss tan $\delta$, for example, provide an indication of the dielectric property. The base body 10 is composed of a transparent resin, preferably polycarbonate.

Embodiment

In the following, an example and comparative examples of the present invention are described.

A test piece composed of a polycarbonate film base body (base) whose thickness was 3.5 mm was prepared (comparative example 1). Bright film pieces were obtained by vacuum depositing tin on the polycarbonate film base bodies whose thicknesses were 3.5 mm such that the thicknesses of tin were 10 nm, 30 nm, and 50 nm (example). Bright film pieces were obtained by vacuum depositing indium instead of tin such that the thicknesses of indium were 10 nm, 30 nm, and 50 nm (comparative example 2). The tin-deposit pieces in the example had an appearance featuring a bright-silver effect that was equivalent to that of the indium-deposit pieces in comparative example 2.

Table 1 shows these test pieces.

[Performance Evaluation]

Radio Transmission Loss

Figure 3:
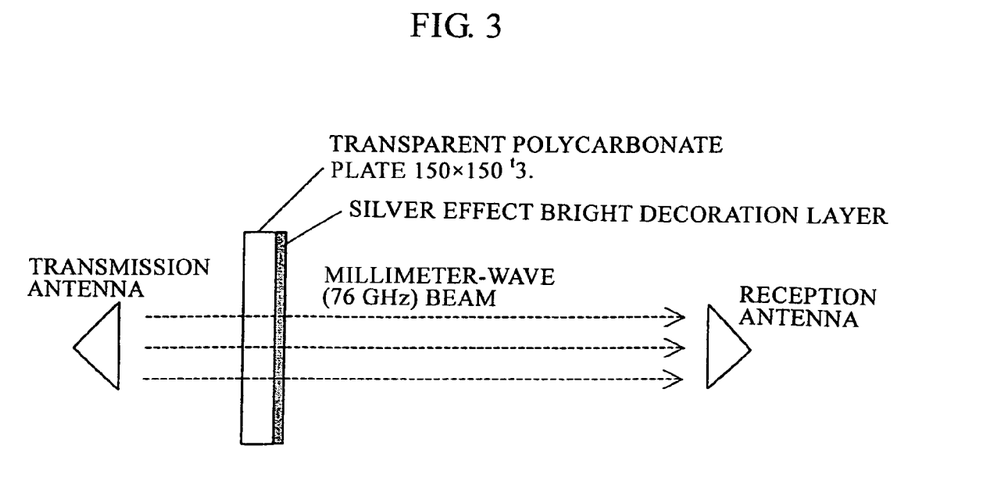
FIG. 3 shows an illustration describing a test method of radio properties.

As shown in FIG. 3, radio transmission loss was measured at 76 GHz, which was frequency applied to millimeter-wave radars for automobiles.

Measurement of Hardness of Film Layer

Figure 4:
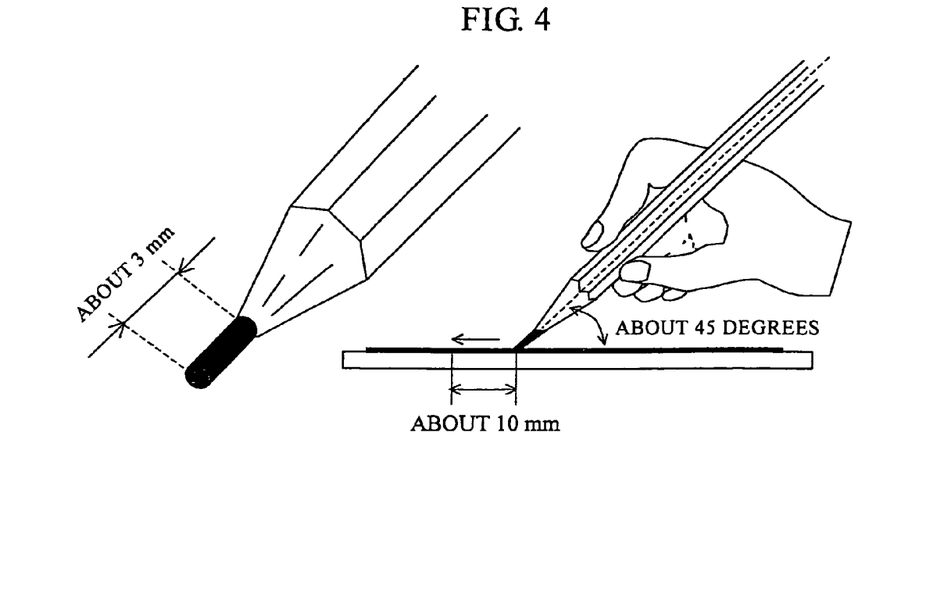
FIG. 4 shows an illustration of a test method of hardness.

A hardness test carried out by the inventors is described with reference to FIG. 4. FIG. 4 shows a pencil-scratch test method. As shown by the figure, the surface of a bright film was scratched using a pencil whose lead length was about 3 mm. The pencil was moved forward as much as 1 cm at a constant speed such that the angle of inclination of the pencil was about 45 degrees, the pencil being grabbed by a right hand and pressed as hard as possible onto the surface of the bright film without breaking the lead. Pencils with hardness ranging from high to low were used and the darkness scale of the pencils that caused exfoliation of the bright film was recorded. The evaluation was carried out on the basis of 9 H in the darkness scale for the hardest pencil and 6B in the darkness scale for the softest pencil.

Abrasion Resistance Test of Film Layer

Figure 5:
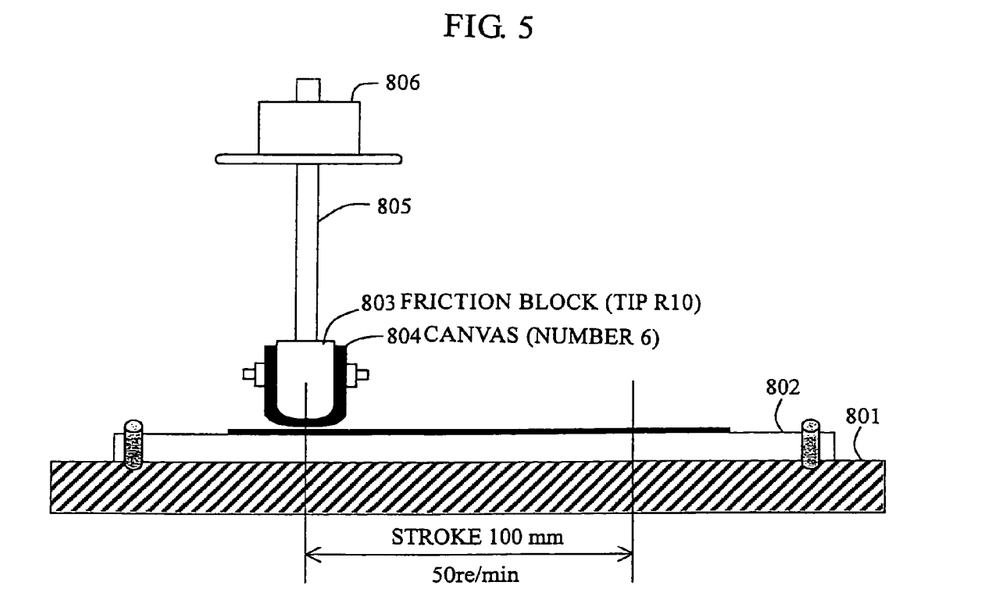
FIG. 5 shows an illustration of a test method of abrasion resistance.

An abrasion resistance test carried out by the inventors is described with reference to FIG. 5. FIG. 5 shows a plane abrasion test method. As shown by the figure, a sample 802 was fixed on a sample stage 801 and the surface of the sample 802 was rubbed by a friction block 803. A weight 806 was disposed on the friction block 803 via a support 805. Force provided to the tip of the friction block 803 was 9.8 N. The radius of a sphere at the tip of the friction block 803 was 10 mm and the surface thereof was covered with canvas (number 6) 804.

The stroke width of the friction block 803 was 100 mm and the movement speed was 50 strokes per minute. The number of strokes was measured when the film on the surface of the sample started to experience exfoliation. The exfoliation of the film was determined by visual observation.

Table 2 shows the measurement results.

TABLE 1

|  | Materials | Film-forming method | Film thickness | Appearance |
| --- | --- | --- | --- | --- |
| Comparative example 1 | Polycarbonate ' 3.5 |  |  | Transparent |
| Example | Polycarbonate ' 3.5 Tin | Vacuum deposition | 10 nm | Bright silver effect with slight transparency |
|  |  |  | 30 nm | Bright silver effect |
|  |  |  | 50 nm | Bright silver effect |
| Comparative example 2 | Polycarbonate ' 3.5 Indium | Vacuum deposition | 10 nm | Bright silver effect with slight transparency |
|  |  |  | 30 nm | Bright silver effect |
|  |  |  | 50 nm | Bright silver effect |

TABLE 2

| | Bright layer thickness (nm) | Film component performance ||| |
| | | Millimeter-wave transmission loss | Pencil hardness | Abrasion resistance |
|---|---|---|---|---|
| Example | 10 | 0.5 | | |
| | 30 | 0.7 | Exfoliation by HB, no exfoliation by B | Exfoliation at 40 to 50 strokes |
| | 50 | 0.8 | | |
| Comparative example 2 | 10 | 0.7 | | |
| | 30 | 0.8 | Exfoliation by 5B, no exfoliation by 6B | Exfoliation at 3 to 5 strokes |
| | 50 | 0.8 | | |

As Table 2 indicates, a tin-film component according to the present invention obtains a design featuring bright-silver effect equivalent to that of an indium-film component of the prior art and performance of millimeter-wave transmission loss, and provides a strong film layer that overcomes the problems of the indium-film component. Therefore, the component can be provided by a simpler material arrangement than in the case of a bright decoration component composed of the indium-film component of the prior art. The simpler material arrangement leads to productivity improvement, and materials can be obtained at a low price. Also, by using low-price tin materials, components can be provided at a low price, since indium-film components are considerably expensive.

What is claimed is:

1. A molded component, for the beam path of a radar apparatus, comprising:
   a base body composed of a resin layer, and
   a bright decoration layer disposed on the surface of said base body, said bright decoration layer comprising a plurality of layers including a tin-alone layer and a tin alloy layer, wherein each layer that forms said bright decoration layer has a thickness of 1 nm to 500 nm, the molded component exhibiting a low level of radio transmission loss that allows passage of a radar beam therethrough.

2. The molded component for the beam path of a radar apparatus according to claim 1, wherein the tin alloy comprises an alloy of tin (Sn) and one or more elements selected from indium (In), gallium (Ga), antimony (Sb), and bismuth (Bi).

3. The molded component for the beam path of a radar apparatus according to claim 1, wherein said bright decoration layer is formed by vacuum deposition.

4. The molded component for the beam path of a radar apparatus according to claim 1, wherein each layer that forms said bright decoration layer comprising the tin and/or a tin alloy has a thickness of 10 nm to 100 nm.

5. The molded component for the beam path of a radar apparatus according to claim 1, wherein said base body is formed by a transparent resin having a low radio transmission loss.

6. The molded component for the beam path of a radar apparatus according to claim 1, wherein said base body is formed by a transparent resin having a low dielectric loss.

7. The molded component for the beam path of a radar apparatus according to claim 1, further comprising a non-transparent resin layer for enhancing tone of color.

* * * * *